US011226469B2

(12) United States Patent
Fan et al.

(10) Patent No.: US 11,226,469 B2
(45) Date of Patent: Jan. 18, 2022

(54) OPTICAL DRIVING MECHANISM

(71) Applicant: TDK TAIWAN CORP., Taoyuan (TW)

(72) Inventors: Chen-Hsien Fan, Taoyuan (TW); Chao-Chang Hu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 505 days.

(21) Appl. No.: 16/173,373

(22) Filed: Oct. 29, 2018

(65) Prior Publication Data

US 2019/0129132 A1 May 2, 2019

Related U.S. Application Data

(60) Provisional application No. 62/578,669, filed on Oct. 30, 2017.

(30) Foreign Application Priority Data

Aug. 3, 2018 (CN) .......................... 201810874133.X

(51) Int. Cl.
*G02B 7/10* (2021.01)
*G03B 5/00* (2021.01)
(Continued)

(52) U.S. Cl.
CPC ................. *G02B 7/10* (2013.01); *G03B 5/00* (2013.01); *G03B 13/36* (2013.01); *G11B 7/0935* (2013.01);
(Continued)

(58) Field of Classification Search
CPC ... G02B 7/00; G02B 7/02; G02B 7/04; G02B 7/09; G02B 7/10; G02B 27/646;
(Continued)

(56) References Cited

U.S. PATENT DOCUMENTS 8,073,320 B2 * 12/2011 Topliss ................... G02B 7/005
396/133
8,175,449 B2 * 5/2012 Kubo ....................... G03B 3/10
396/89
(Continued)

FOREIGN PATENT DOCUMENTS

CN 208580290 U 3/2019
WO WO2016178152 A1 11/2016

OTHER PUBLICATIONS

Chinese Office Action dated Jan. 29, 2021 for corresponding Application No. 201810874133.X, 8 pages.

*Primary Examiner* — Nicholas R. Pasko
(74) *Attorney, Agent, or Firm* — Muncy, Geissler, Olds and Lowe, P.C.

(57) ABSTRACT

An optical driving mechanism is provided, configured to drive an optical element, including a fixed portion, a movable portion, a frame assembly, and a biasing element. The fixed portion includes a base which has a central axis. The movable portion is configured to sustain the optical element and is movable relative to the fixed portion. The frame assembly connects the fixed portion and the movable portion and includes a plurality of string arms, wherein the string arms form at least one V-shaped structure. The biasing element is disposed on the frame assembly and is configured to drive the movable portion to move along a central axis direction relative to the fixed portion, wherein the string arms surround the biasing element and the biasing element is connected to at least one end portion of the V-shaped structure.

14 Claims, 16 Drawing Sheets

(51) Int. Cl.
  *G03B 13/36* (2021.01)
  *H04N 5/225* (2006.01)
  *G11B 7/09* (2006.01)
(52) U.S. Cl.
  CPC ......... *H04N 5/2253* (2013.01); *H04N 5/2254* (2013.01); *H04N 5/2257* (2013.01); *G03B 2205/0053* (2013.01)
(58) Field of Classification Search
  CPC ...... G02B 7/08–105; G03B 5/00; G03B 5/02; G03B 13/32; G03B 13/34; G03B 13/36; G03B 2205/0015; G03B 2205/0053; G03B 2205/0069; G03B 2217/002; G11B 7/0908; G11B 7/0932; G11B 7/0933; G11B 7/0935; H04M 1/0264; H04N 5/2251; H04N 5/2253; H04N 5/2254; H04N 5/2257
  USPC ....... 359/554, 642, 694, 811, 819, 822, 823; 396/89, 144
  See application file for complete search history.

(56) References Cited

U.S. PATENT DOCUMENTS

| | | | |
|---|---|---|---|
| 8,830,335 B2* | 9/2014 | Topliss | G02B 27/646 |
| | | | 348/208.11 |
| 2011/0176046 A1* | 7/2011 | Hu | G03B 3/10 |
| | | | 348/335 |
| 2015/0346507 A1* | 12/2015 | Howarth | F03G 7/06 |
| | | | 359/557 |
| 2017/0315274 A1* | 11/2017 | Park | G02B 7/08 |
| 2018/0052381 A1* | 2/2018 | Koepfer | G03B 5/00 |
| 2019/0136839 A1* | 5/2019 | Miller | G02B 27/646 |
| 2020/0166024 A1* | 5/2020 | Webber | G03B 13/36 |

* cited by examiner

OPTICAL DRIVING MECHANISM

CROSS REFERENCE TO RELATED APPLICATIONS

This application claims the benefit of U.S. Provisional Application No. 62/578,669, filed on Oct. 30, 2017, and China Patent Application No. 201810874133.X, filed on Aug. 3, 2018, the entirety of which is incorporated by reference herein.

BACKGROUND OF THE INVENTION

Field of the Invention

The application relates in general to an optical driving mechanism, and in particular to an optical driving mechanism that includes at least one frame assembly and at least one biasing element.

Description of the Related Art

Thanks to ongoing technological developments, recent electronic devices (such as tablet computers and smartphones) usually include a lens module capable of aiding in photography or recording video, and some are even equipped with dual lens modules, bringing users a wealth of visual enjoyment. However, an image may come out blurry if the user shakes the lens module in the electronic device when using it. To improve image quality, it is increasingly important to design an effectively shockproof lens module. In addition, designers are currently pursuing the miniaturization of such devices, and it is expected that electronic products will be smaller and lighter with each successive generation. Therefore, how to design an optical mechanism with a better optical compensation function with a smaller volume through a special configuration is an important issue.

BRIEF SUMMARY OF INVENTION

To address the deficiencies of conventional products, an embodiment of the invention provides an optical driving mechanism, configured to drive an optical element, including a fixed portion, a movable portion, at least one frame assembly, and at least one biasing element. The fixed portion includes a base which a central axis. The movable portion is configured to sustain the optical element and is movable relative to the fixed portion. The frame assembly connects the fixed portion and the movable portion and includes a plurality of string arms, wherein the string arms form at least one V-shaped structure. The biasing element is disposed on the frame assembly and configured to drive the movable portion to move along a central axis direction relative to the fixed portion, wherein the string arms surround the biasing element and the biasing element at least connects one end portion of the V-shaped structure.

In some embodiments, the frame assembly at least includes four string arms, wherein the string arms form two V-shaped structures which are connected each other, and the biasing element connects two end portions of the V-shaped structures. The extending direction of the biasing element is not parallel to the direction of the central axis. The string arms and the biasing element are disposed on a first surface, and the first surface is parallel to the central axis. The angle between the string arms and the biasing element is less than 45 degrees. The frame assembly presents a parallelogram structure, and the two ends of the biasing element connect the diagonal of the parallelogram structure.

In some embodiments, the frame assembly further includes a linking rod, the two ends of the linking rod are connected to the string arms, wherein the biasing element is surrounded by the linking rod and the string arms, and the two ends of the biasing element connect the linking rod to the end portion, wherein the end portion is at the vertex portion of the inner side of the V-shaped structure. In another embodiment, the biasing element connects the two end portions of the two sides of the V-shaped structure, and the extending direction of the biasing element is parallel to the central axis. The frame assembly further includes an electrical conductor disposed on at least one of the string arms of the frame assembly in a manner of insert molding or 3D molded interconnect device technology, and the electrical conductor is electrically connected to the biasing element.

In some embodiments, the optical driving mechanism further comprises a detection element, configured to detect the motion of the movable portion relative to the fixed portion, wherein the detection element, the frame assembly and the biasing element are arranged along the central axis. The optical driving mechanism further comprises a plurality of frame assemblies which are stacked in the direction of the central axis. The optical driving mechanism further comprises a plurality of biasing elements, wherein the string arms of each frame assembly enclose one biasing element.

In some embodiments, the optical driving mechanism further comprises three frame assemblies which are stacked in the direction of the central axis, and the frame assemblies and the biasing element consist of a frame module, wherein in the direction of the central axis, the frame assembly in the middle position surrounds the biasing element. The optical driving mechanism further comprises a plurality of frame assemblies and a plurality of biasing elements, wherein the frame assemblies surround the movable portion, and the biasing elements are electronically independent of each other. In another embodiment, the optical element is an image sensor, the base has at least one through hole, and the frame assembly extends through the through hole and is connected to the base and the image sensor.

Another embodiment of the invention provides an optical driving mechanism, comprising a fixed portion, a movable portion, a frame assembly and a biasing element. The fixed portion includes a liquid optical element and a base, wherein the base has a central axis. The movable portion includes a contact member, and the movable portion is movable relative to the fixed portion. The frame assembly is connected to the fixed portion and the movable portion and including a plurality of string arms, wherein the string arms at least form a V-shaped structure. The biasing element is disposed on the frame assembly and configured to force the movable portion to move relative to the fixed portion along the direction of the central axis, wherein the contact member is in contact with the liquid optical element via the driving force of the biasing element, and the shape of the liquid optical element is changed.

Another embodiment of the invention provides an optical driving mechanism, comprising a fixed portion, a movable portion, a frame assembly, a biasing element and a driving portion. The fixed portion includes a base, wherein the base has a central axis. The movable portion is movable relative to the fixed portion, including: a holder, configured to sustain the optical element; and a support member, movably connected to the fixed portion. The frame assembly is connected to the support member and the holder and includes a plurality of string arms, wherein the string arms at least form a V-shaped structure. The biasing element is disposed on the frame assembly and configured to force the movable portion to move relative to the fixed portion along the direction of the central axis, and the string arms enclose the biasing element. The driving portion is configured to force the movable portion to move relative to the fixed portion along a first direction, wherein the direction of the central axis is different from the first direction.

In some embodiments, the driving portion includes a coil and a magnetic element, wherein the coil is disposed on the fixed portion, and the magnetic element is disposed on the movable portion. The optical driving mechanism further comprises a plurality of elastic members around the support member, and the elastic members connect the base of the fixed portion to the support member of the movable portion.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical systems are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
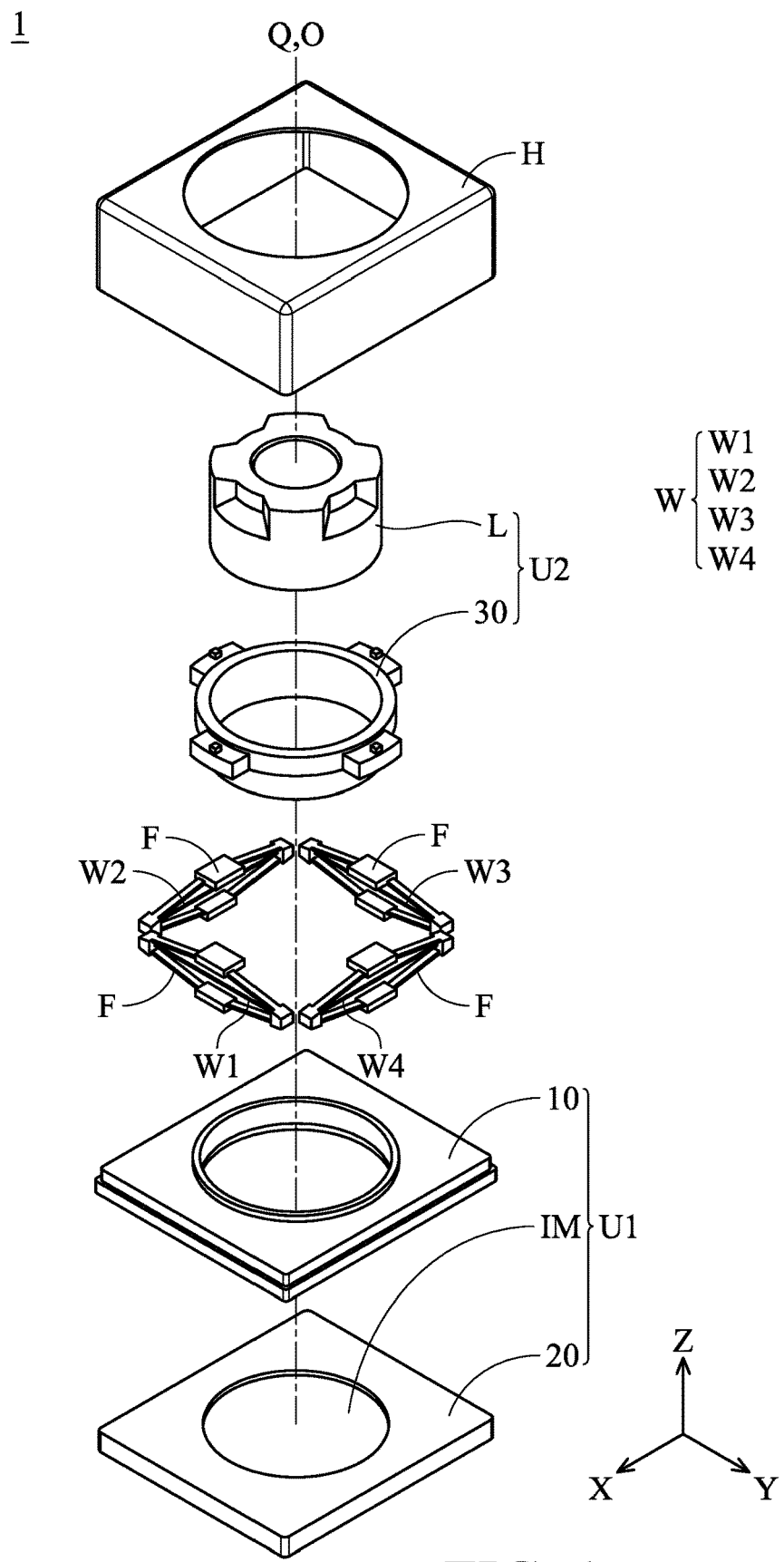
FIG. 1 is an exploded view diagram of an optical driving mechanism according to an embodiment of the present invention.
Figure 2:
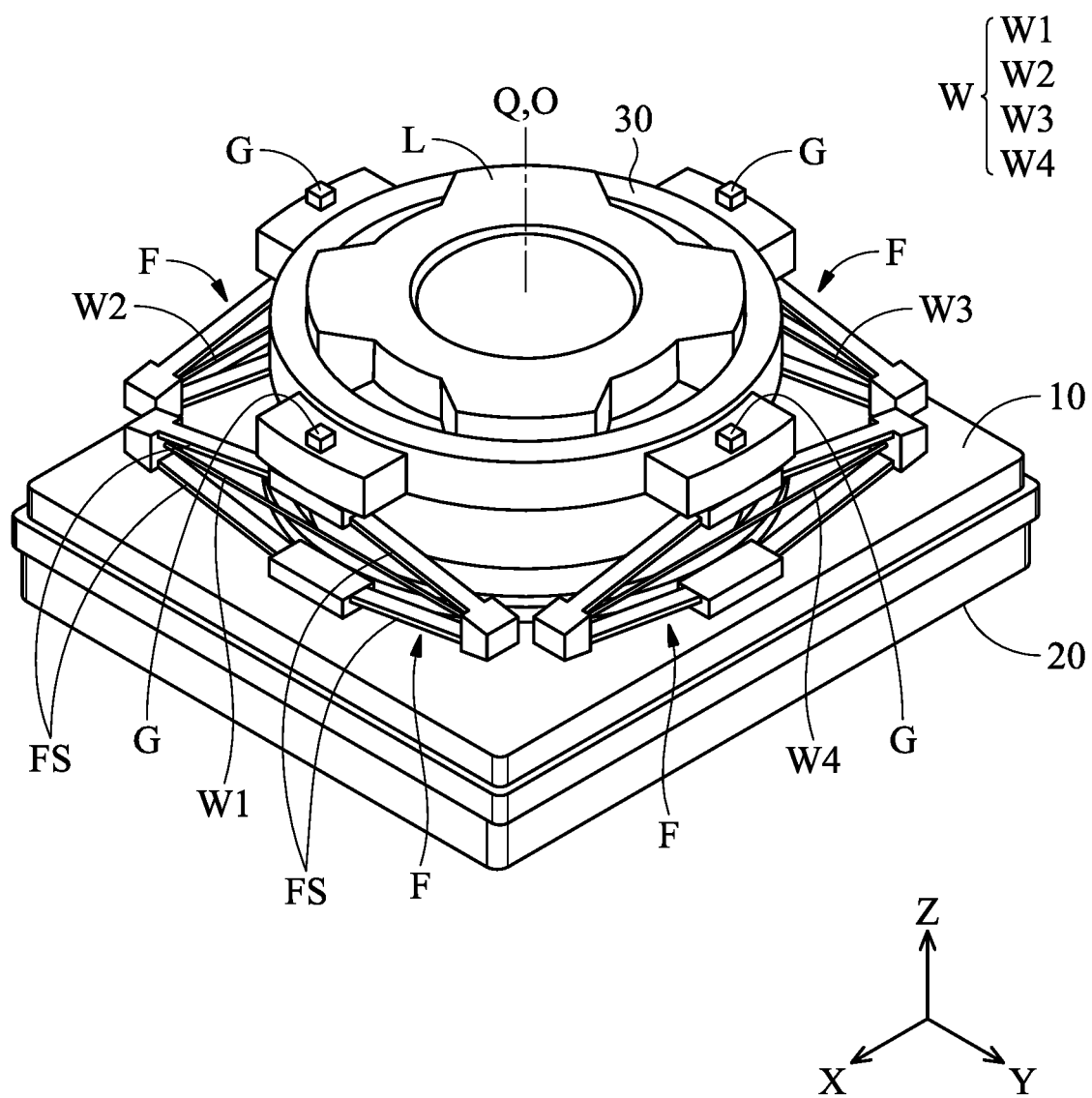
FIG. 2 is a schematic diagram of the optical driving mechanism in FIG. 1.

Referring to FIGS. 1 and 2, FIG. 1 is an exploded view showing the optical driving mechanism 1 according to an embodiment of the present invention, and FIG. 2 is a schematic view showing the assembled optical driving mechanism 1 (the housing H is omitted). The optical driving mechanism 1 can be used, for example, to drive and sustain an optical element L (such as a lens or a lens assembly), and can be disposed inside an electronic device (such as a camera, a tablet or a mobile phone). When light (incident light) from the outside enters the optical driving mechanism 1, the light passes through the optical element L of the optical driving mechanism 1 along the optical axis O of the optical element L and then to another optical element IM (such as image sensor) disposed in the optical driving mechanism 1, to acquire an image. The optical driving mechanism 1 can move the optical element L disposed therein relative to the optical element IM to achieve the purpose of Auto-Focusing (AF) and Optical Image Stabilization (OIS). The detailed structure of the optical driving mechanism 1 will be described below.

As shown in FIGS. 1 and 2, the optical driving mechanism 1 primarily comprises a fixed portion U1, a movable portion U2, a plurality of frame assemblies F, a biasing assembly W (including biasing elements W1 to W4) and a housing H. The movable portion U2 is connected to the fixed portion U1 via the frame assemblies F and the biasing assembly W and movable relative to the fixed portion U1. The fixed portion U1 is affixed to the inside of the electronic device, for example, it can be affixed to a casing inside of the electronic device. The aforementioned housing H can be configured to protect the fixed portion U1 and the movable portion U2.

The fixed portion U1 includes a base 10 and a carrier plate 20. The carrier plate 20 can be a holder for carrying or sustaining an optical element IM such as an image sensor. The carrier plate is affixed to the base 10 and below the base 10 (Z axis; in the direction of the optical axis O). The movable portion U2 includes a holder 30 and an optical element L. The holder 30 has a receiving space for the optical element L to be disposed therein. In the initial position, the central axis Q of the base 10 coincides with the optical axis O of the optical element L.

It should be noted that the movable portion U2 is connected to the fixed portion U1 by the frame assemblies F and the biasing assembly W, and is movable relative to the fixed portion U1. In detail, the plurality of frame assemblies F are disposed around the holder 30. In the present embodiment, the optical driving mechanism 1 has four frame assemblies F located substantially at the four sides of the base 10, respectively. Each frame assembly F has a plurality of (four) flexible string arms FS, such as elongated elastic sheets, which form a parallelogram structure or a rhombus (or diamond) structure. More specifically, defining two parts of the frame assembly F: the upper and lower parts (in the Z-axis direction), two adjacent string arms FS of the upper and lower parts form a V-shaped structure, and the four string arms FS form two V-shaped structures, and the two end portions of the two sides of each of the two V-shaped structures are connected to each other. The biasing assembly W has a plurality of (four) biasing elements W1 to W4 which are disposed to correspond to the respective frame assemblies F. In detail, each of the biasing elements W1 to W4 is surrounded by the four string arms FS of one frame assembly F and connected to at least one end portion of the V-shaped structure. In more detail, in this embodiment, both ends of the biasing element W1 (or W2~W4) are connected to two end portions (corner portions; vertex portions) of two mutually connected V-shaped structures, or each of the biasing elements W1 to W4 is connected to the diagonal of the frame assembly F having a parallelogram structure. Further, the string arms FS and the corresponding biasing element W1 (or W2, W3, W4) are disposed on a first surface parallel to the central axis Q or the optical axis O. Moreover, the extending direction or the major axis direction of each of the biasing elements W1 to W4 is different from the central axis Q direction, or is not parallel to the central axis Q direction. In this embodiment, the extending directions of the biasing elements W1 to W4 are substantially perpendicular to the central axis Q direction.

The length of biasing elements W1 to W4, which may be wires comprising a shape-memory alloy (SMA), can be changed by applying one or more driving signals (e.g., electrical current) to them from an external power source. For example, when applying driving signals to heat the biasing element W1 (or W2, W3, W4), the biasing element W1 is deformed (e.g., elongated or shortened). When the application of the driving signal is stopped, the deformed biasing element W1 will recover to its original length. In other words, by applying one or more appropriate driving signals, the lengths of the biasing element W1 can be controlled, so that the flexible string arms FS which are connected to the biasing element W1 are pushed or pulled to alter the posture of the holder 30. The biasing element W1 (or W2, W3, W4), for example, may comprises a titanium-nickel (TiNi) alloy, a titanium-palladium (TiPd) alloy, a titanium-nickel (TiNiCu) alloy, a titanium-nickel-palladium (TiNiPd) alloy, or a combination thereof.

It should be noted that, in this embodiment, four frame assemblies F and four biasing elements W1 to W4 are disposed around the holder 30, but in other embodiments, other numbers of frame assemblies and biasing elements may be arranged. For example, one, two or three frame assemblies F with the corresponding quantity of biasing element(s) are disposed around or outside the holder 30, and a corresponding guiding mechanism may be provided with, such as a pulley guiding mechanism, which can also drive the holder 30 to move.

Figure 3A:
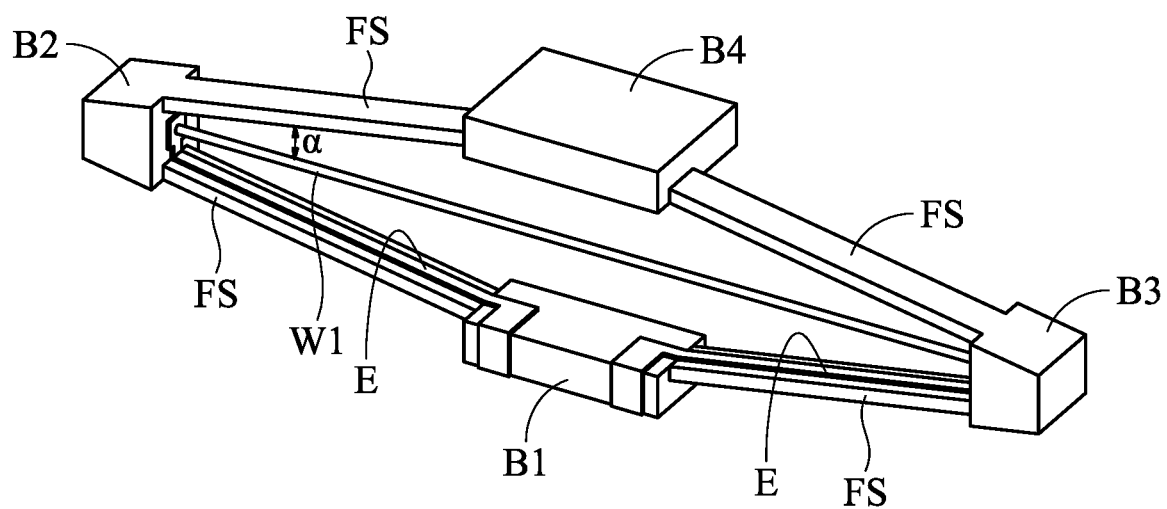
FIG. 3A is a schematic diagram of one frame assembly and one biasing element in FIG. 2.

FIG. 3A is a schematic view showing one of the frame assemblies F in FIG. 2. The frame assembly F further includes a plurality of connecting pieces B1 to B4, wherein the connecting piece B1 is affixed to the base 10, and the connecting piece B4 is affixed to the holder 30. The affixing manner, for example can be adhesion, engagement or tight matching. The connecting pieces B2 and B3 are located between the connecting pieces B1 and B4 (in Z-axis or central axis Q direction). Both ends of each string arm FS of the frame assembly F are connected to the connecting pieces (B1 to B4) to form a parallelogram structure.

Still referring to FIG. 3A, the optical driving mechanism 1 further comprises a plurality of electrical conductors E (such as conductive wires) are formed on the string arms FS of the frame assembly F and the connecting pieces B1, B2 and B3 by insert molding or 3D molded interconnect device technology. The electrical conductors E electrically connect to the biasing element W1. The other frame assemblies F corresponding to the biasing elements W2 to W4 are also provided with the electrical conductors E in the same configuration to electrically connect the biasing elements W2 to W4. In this embodiment, the four biasing element W1 to W4 surrounding the holder 30 are electrically independent and form four independent circuits via the electrical conductors E. Therefore, a driving signal(s), such as a driving current(s), may be applied to the biasing elements W1 to W4 through an external power source (not shown) to enable the biasing elements W1 to W4 to independently change their lengths, thereby adjusting the posture angle of the holder 30. It should be understood that, in order to clearly and succinctly show the components, the electrical conductors E are only depicts in FIG. 3A, and are omitted in other figures.

In some embodiments, the electrical conductors E are directly in contact with and electrically connected to each of the biasing elements W1 to W4. In some embodiments, the connecting pieces B1, B2, and B3 may have a conductive material, and the electrical conductors E are electrically connected to the connecting pieces B1, B2, and B3 and each of the biasing elements W1 to W4. It should be noted that since the electrical conductors E are formed on the string arms FS by insert molding or 3D molded interconnect device technology, the additional space for providing the independent electrical conductors inside the optical driving mechanism can be reduced, and the volume thereof can be greatly reduced to a small size. In some embodiments, the connecting pieces B1 to B4 can be integrally formed with the string arms FS of the frame assembly F.

Figure 3B:
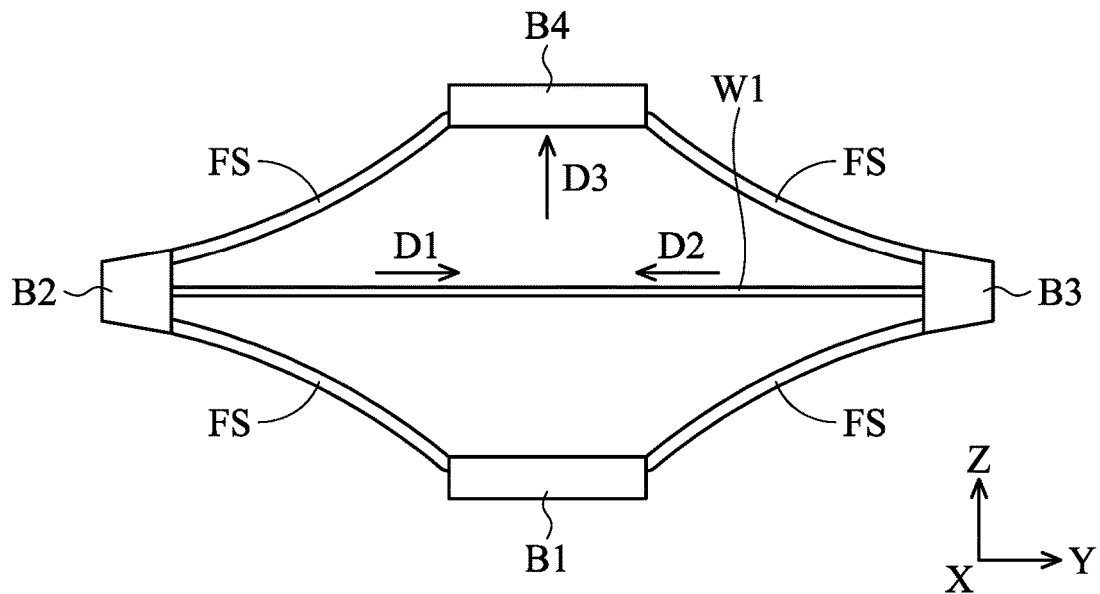
FIG. 3B is a schematic diagram of the contraction of the biasing element in FIG. 3A to deform the frame assembly.
Figure 3C:
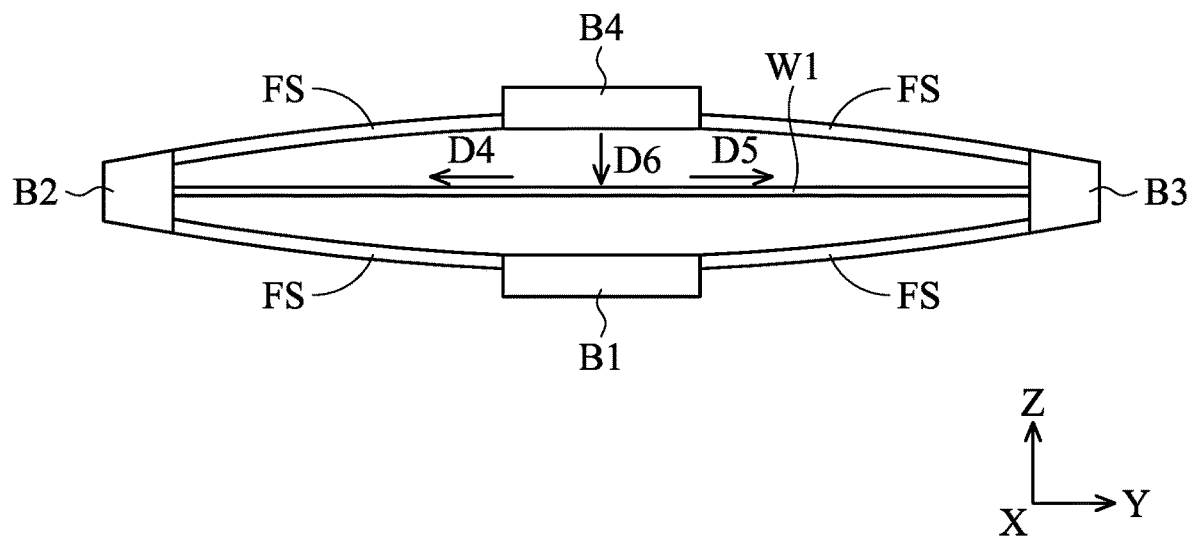
FIG. 3C is a schematic diagram of the elongation of the biasing element in FIG. 3A to deform the frame assembly.

Regarding the deformation of the biasing elements, taking the biasing element W1 as an example, as shown in FIG. 3B, when the appropriate driving signal is applied so that the biasing element W1 is deformed and shortened toward the directions D1 and D2, the string arms FS of the frame assembly F thus deform and push the connecting piece B4 in the direction D3, i.e., in the direction of the central axis Q or the optical axis Q, thereby forcing the holder 30 and the optical element L in FIG. 2 to move. Similarly, as shown in FIG. 3C, applying a suitable driving signal causes the biasing element W1 to deform in the direction D4 and D5 to elongate, so that the string arms FS of the frame assembly F being deformed and the connecting piece B4 is pulled in the direction D6, that is, moving in the direction of the axis Q or the optical axis Q, thereby changing the position of the holder 30 and the optical element L.

It should be understood that the biasing elements W1 to W4 are electrically independent of each other and connected to an external power source, so that a plurality of different driving signals can be applied to the biasing element W1 to W4. Thus, the biasing elements W1 to W4 are independently controlled to make different or the same length variations.

Figure 4C:
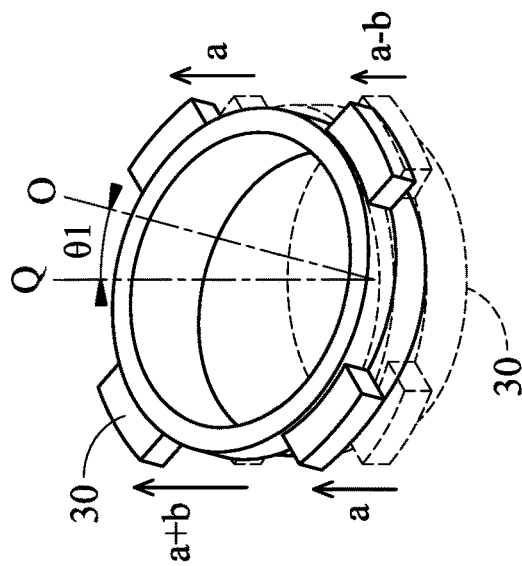
FIGS. 4A to 4C are schematic diagrams of the movement of the holder of FIG. 2.
Figure 4B:
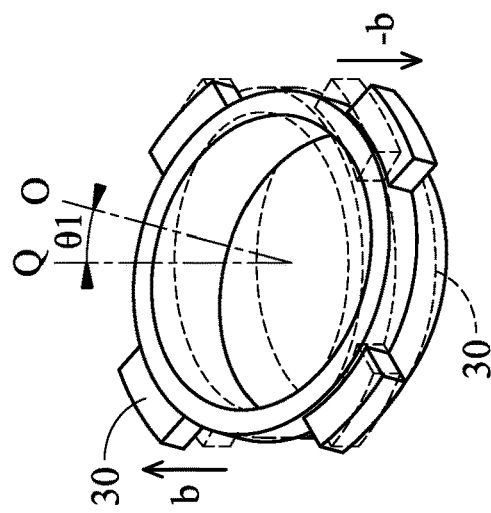
Figure 4A:
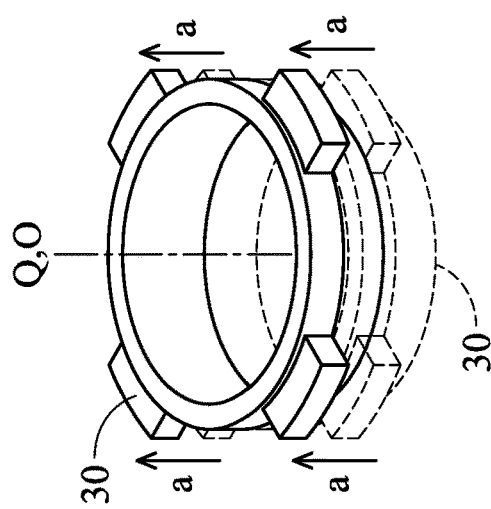

For example, referring to FIG. 4A, when the same driving signals are applied to each of the biasing elements W1 to W4 in FIG. 2 and the deformations thereof are shortened to generate the same length change, for example, the shortening amount of the biasing element W1 to W4 are the same, the connecting pieces B4 in each frame assembly F are displaced upward (Z-axis direction) by a distance a. At this time, the biasing elements W1 to W4 can drive the holder 30 and the optical element L to linearly move relative to the base 10 in the direction of the optical axis O, so that the purpose of auto-focusing can be achieved.

Referring to FIG. 4B, when different driving signals are applied to the biasing elements W2 and W4 in FIG. 2, wherein the biasing element W2 is shortened, the biasing element W4 is deformed, and there is no driving signal applied to the biasing elements W1 and W3 (i.e., the lengths thereof are not changed), the shortening of the biasing element W2 causes the corresponding connecting piece B4 to move upward by the distance b, and the extension of the biasing element W4 causes the corresponding connecting piece B4 to be displaced downwardly by the distance −b. Thus, the holder 30 and the optical element L are inclined with respect to the base 10, i.e., the optical axis O of the optical element L generates an angular displacement θ1 with respect to the central axis Q of the base 10, to achieve tilt angle compensation, the effect of optical compensation for angular compensation.

Similarly, as shown in FIG. 4C, when appropriate driving signals are applied to the biasing elements W1 to W4 and the four connecting pieces B4 corresponding to the biasing elements W1 to W4 are respectively displaced by distances: a, a+b, a, and a−b, the holder 30 and the optical element L are moved by a distance a with respect to the base 10 and have an angular displacement θ1, thereby achieving the functions of auto-focusing and optical shockproof.

It should be noted that in the present embodiment, as in the initial state of the biasing elements W1 to W4 in FIG. 3A, that is, no driving signal is applied, the angle α between each of the string arms FS of the frame assembly F and the biasing element W1 (or W2, W3, W4) is less than 45 degrees, which facilitates the contraction or elongation of the biasing assembly W to drive the frame assembly F to deform and to drive the holder 30.

In addition, please refer to FIG. 2 again, wherein the optical driving mechanism 1 further comprises a plurality of sensing elements G disposed on the holder 30. Specifically, in the direction of the optical axis O, the sensing elements G are correspondingly disposed on the plurality of connecting pieces B4, that is, the sensing element G, the frame assembly F and the biasing element W1 (or W2, W3, W4) are arranged along the central axis Q. The sensing element G can be used to sense the movement of the movable portion U2 relative to the fixed portion U1. For example, a plurality of sensing matching elements (not shown) matching the sensing elements G may be disposed on the inner wall of the outer housing H affixed to the fixing portion U1. The sensing element G may be a permanent magnet or a Hall effect sensor, and the sensing matching element is the other of the two. The Hall effect sensor may determine the position of the permanent magnet by detecting changes in the magnetic field of the permanent magnet, to increase the accuracy of compensation or focusing. In another embodiment, other types of matching or alignment elements/components, such as a magnetoresistive sensor (MRS) or an optical sensor, may also be used to detect the relative position of movable portion U2 and the base 10 of the fixed portion U1.

Figure 5:
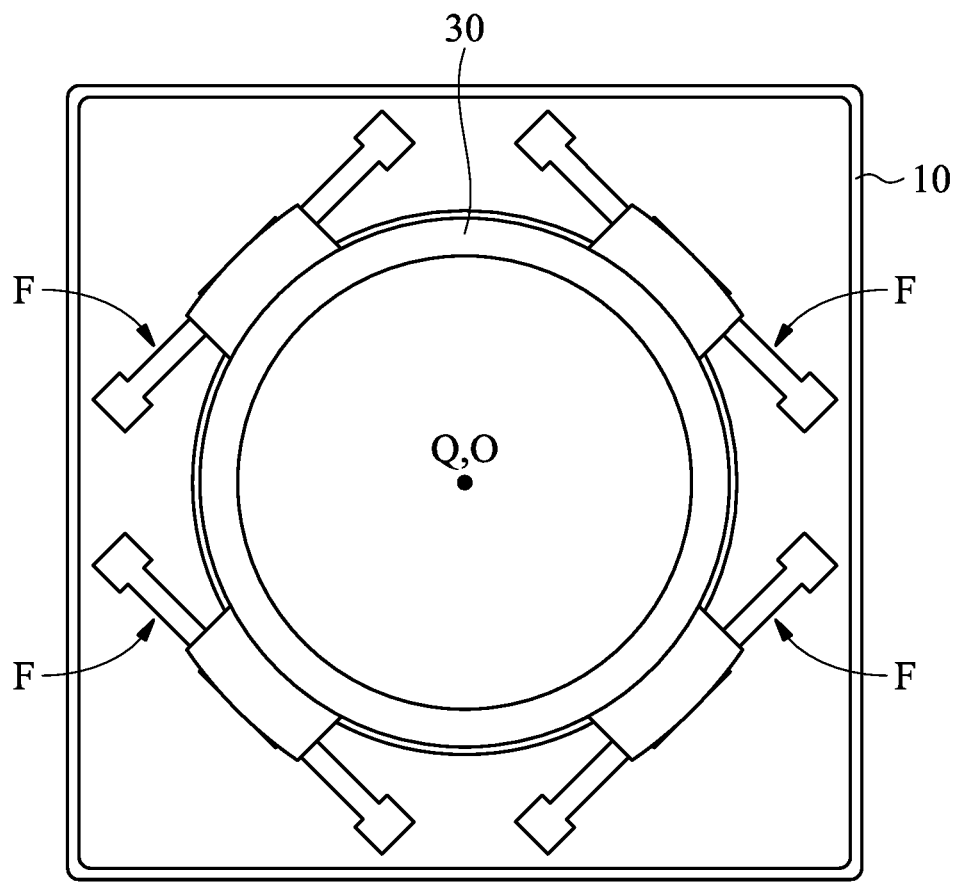
FIG. 5 is a schematic diagram of the arrangement of a plurality of frame assemblies, a holder and a base according to another embodiment of the present invention.

In another embodiment, as shown in FIG. 5, the plurality of frame assemblies F surround the holder 30 with another arrangement which is different from the arrangement in FIG. 2. In detail, the frame assemblies F in this embodiment are adjacent to the corners of the base 10, and the long axis of each frame assembly F is inclined with respect to the sides of the base 10 as viewed from the view.

Figure 6A:
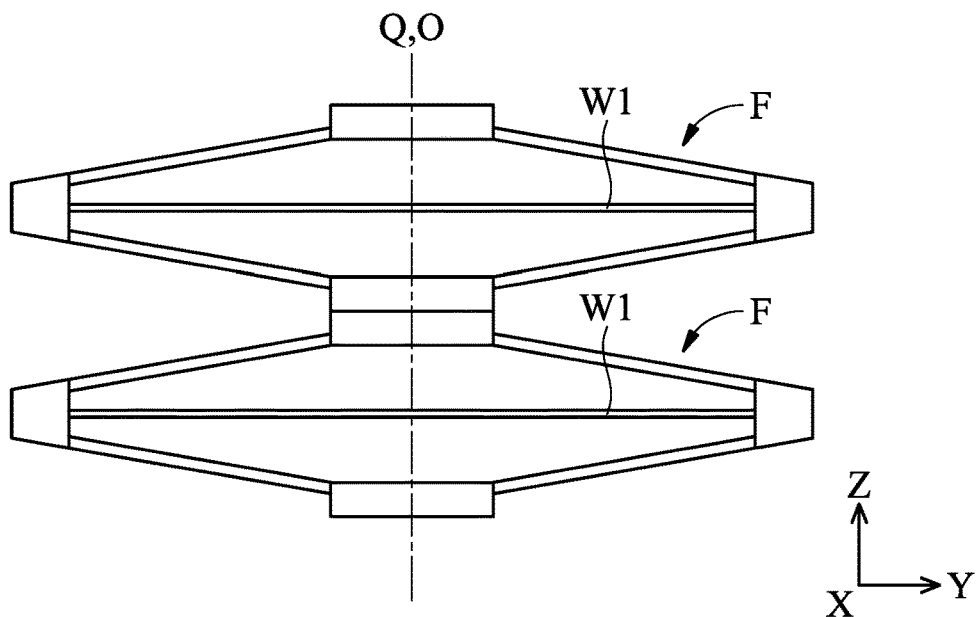
FIG. 6A is a schematic diagram of a plurality of frame assemblies and a plurality of biasing elements that constitute a frame module according to another embodiment of the present invention.

FIG. 6A is a schematic diagram showing a plurality of frame assemblies F and a plurality of biasing elements W1 in another embodiment of the present invention. As shown in FIG. 6A, the two frame assemblies F are stacked along the Z-axis direction, and each of the two frame assemblies F surrounds one biasing element W1 (or W2, W3, W4) to form a frame module 90, and four frame modules 90 are disposed around the holder 30. Compared to the frame module F in FIG. 2, in this way, the holder 30 and the optical element L can have a longer moving distance (in Z axis or optical axis O direction) relative to the base 10 and a larger inclination angle with respect to the central axis Q of the base 10, increasing the driving stroke and the range of the tilt compensation.

Figure 6B:
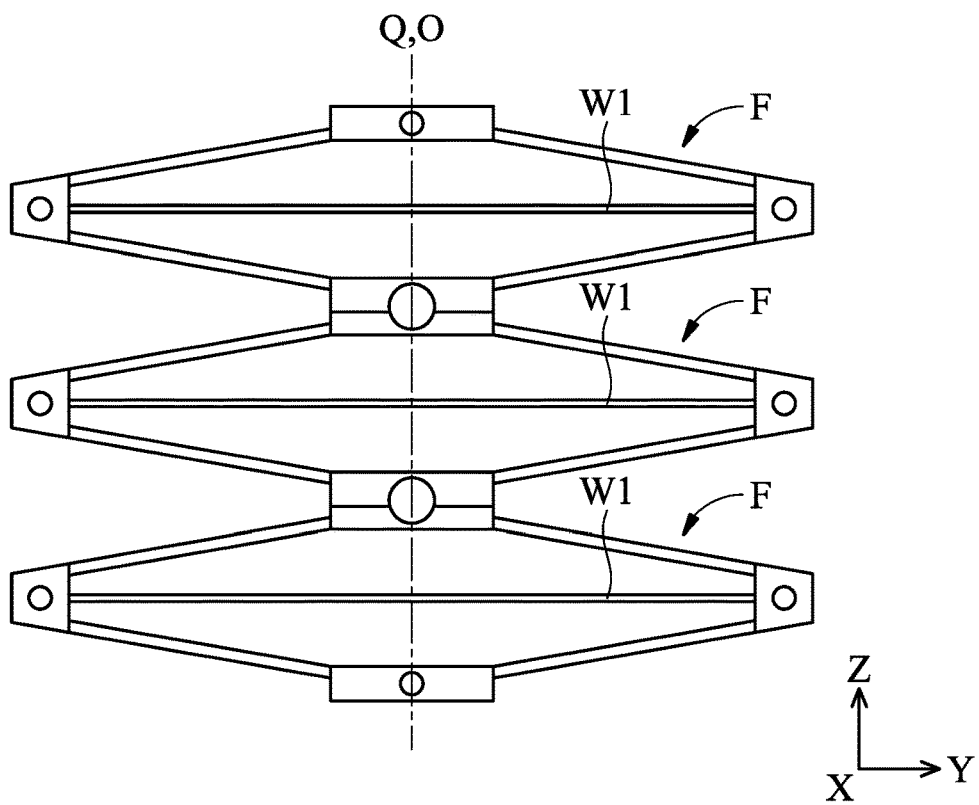
FIG. 6B is a schematic diagram of a plurality of frame assemblies and a biasing element that constitute a frame module according to another embodiment of the present invention.

FIG. 6B is a schematic view showing a plurality of frame assemblies F and a biasing element W1 that form a frame module 90' in another embodiment of the present invention. The frame module 90' is primarily different from the frame module 90 in FIG. 6A in that the frame module 90' has three frame assemblies F stacked in the direction of the central axis Q (Z-axis), and the biasing element W1 (or W2, W3, W4) is disposed in the middle frame assembly F, and no biasing elements are provided in the other two frame assemblies F. In this way, the frame module 90' can not only have a longer driving stroke than the frame assembly 90 in FIG. 6A, but also only one biasing element W1 (or W2, W3, W4) is arranged therein, which saves the arrangement of the conductors and wires connecting the biasing elements, thereby simplifying the number of parts of the overall driving mechanism.

Figure 6C:
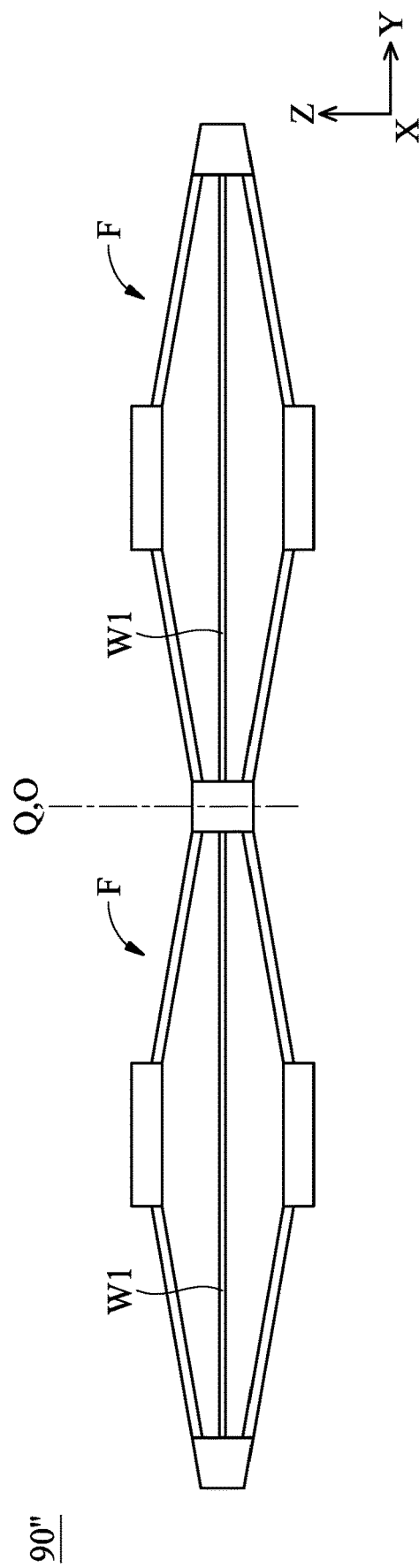
FIG. 6C is a schematic diagram of a frame module according to another embodiment of the present invention.

FIG. 6C is a schematic view showing a plurality of frame assemblies F and a biasing element W1 in another embodiment of the present invention to form a frame module 90". The primary difference between the frame module 90" and the frame module 90 in FIG. 6A is that the frame module 90" has two frame assemblies F arranged along the direction perpendicular to the central axis Q, and each frame assembly F is provided with one biasing element W1, wherein the four string arms FS surround the one biasing element W1. As can be seen from FIG. 6C, the frame module 90" is formed with a substantially X-shaped structure, and the X-shaped structure also includes a V-shaped structure, and the biasing element W1 is connected to at least one end portion of the V-shaped structure. In this configuration, the driving or moving of the holder 30 and the optical element L relative to the base 10 can be better stabilized (by applying an appropriate driving signal to the biasing element W1), and the driving force can be enhanced. In addition, in another embodiment, the two frame assemblies F may share a longer biasing element W1 to reduce the required number of parts and settings of the driving circuit.

Figure 6D:
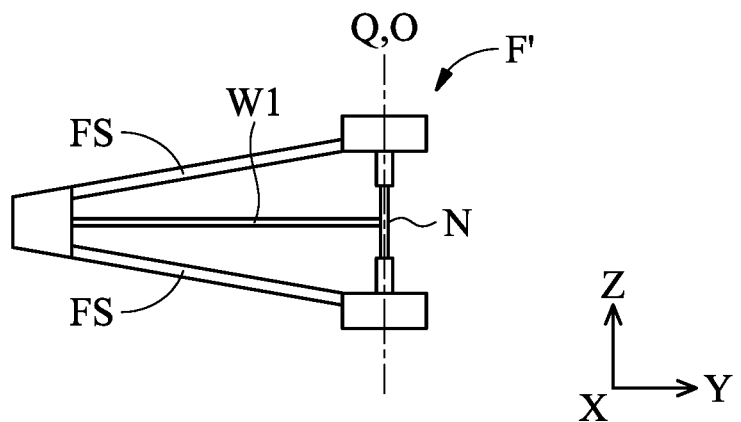
FIG. 6D is a schematic diagram of a frame assembly according to another embodiment of the present invention.

FIG. 6D is a schematic view showing a frame assembly F' in another embodiment of the present invention. The main difference between the frame assembly F' and the frame assembly F in FIG. 3A is that the frame assembly F' includes only two string arms FS and is connected to each other by a movable linking rod N of the frame members F'. The linking rod N can be a telescopic link, and the two ends of the biasing element W1 are respectively connected to the linking rod N and the end portion (corner portion; vertex portion) of the V-shaped structure formed by the two string arms FS (in this embodiment, the end portion can be regarded as the inner vertex portion of the V-shaped structure), and the string arms FS surround the biasing element W1. When a suitable driving signal is applied to the biasing element W1, for example, it is contracted toward or elongated away from the linking rod N, the string arms FS will be deformed in the same or similar manner as in FIGS. 3B, 3C, so that the holder 30 and the optical element L are movable relative to the base 10 to achieve auto-focusing or/and optical shockproof functions. The configuration of this embodiment can reduce the number of parts of the frame assembly F' and the occupied volume, and is advantageous in miniaturization.

Figure 6E:
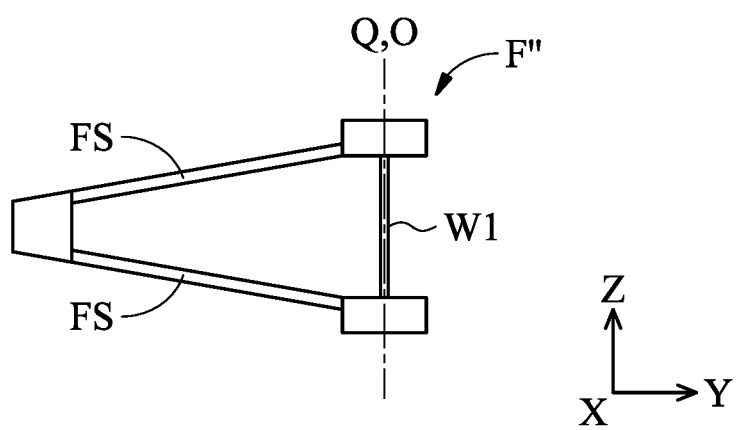
FIG. 6E is a schematic diagram of a frame assembly according to another embodiment of the present invention.

FIG. 6E is a schematic view showing a frame assembly F''' in another embodiment of the present invention. The frame assembly F''' in this embodiment also has only two string arms FS, wherein the two ends of the biasing element W1 are connected to the two end portions of the V-shaped structure which is formed by the two string arms FS. Regarding the configuration of the frame assemblies and the biasing elements, the main difference between this embodiment and the other embodiments in FIGS. 1 to 6D is that the extension or long axis direction of the biasing element W1 in this embodiment (FIG. 6E) and its contraction or elongation direction (i.e., the direction of motion) is parallel or identical to the central axis Q direction and the moving direction of the holder 30 and the optical element L, and is no longer perpendicular or substantially perpendicular to the central axis Q direction, and the moving direction of the holder 30 and the optical element L.

Figure 7:
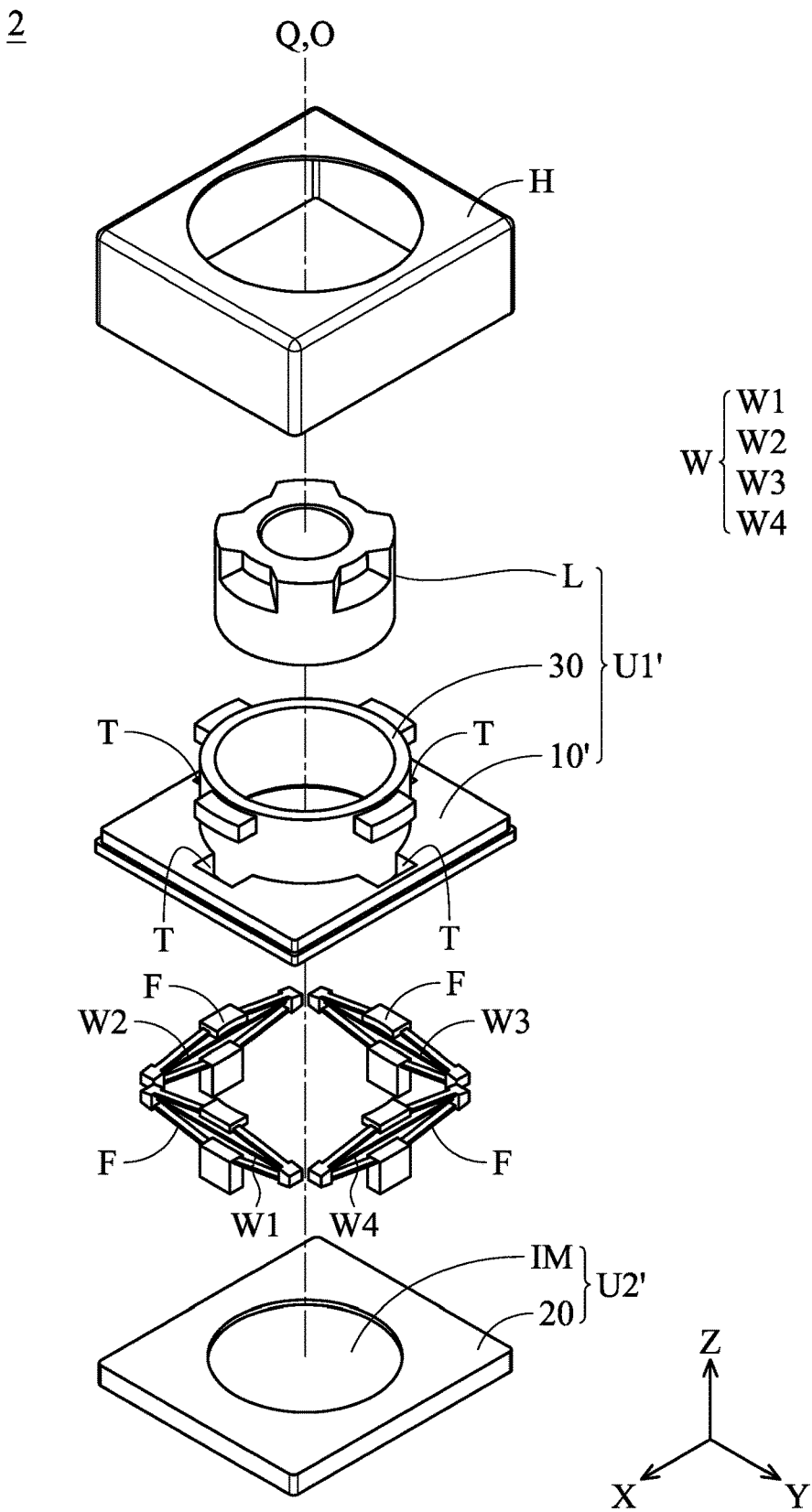
FIG. 7 is an exploded view diagram of an optical driving mechanism according to another embodiment of the present invention.
Figure 8:
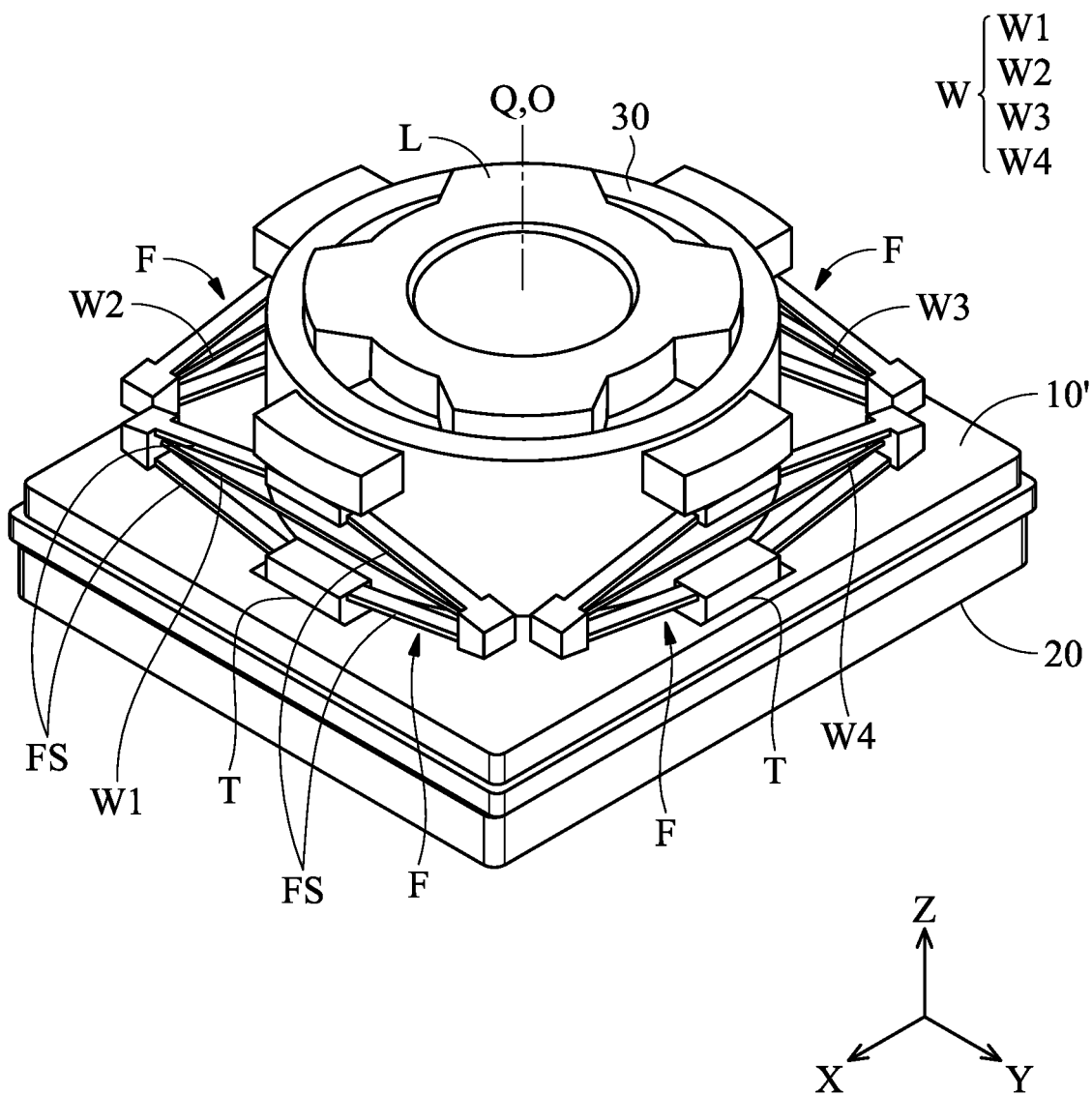
FIG. 8 is a schematic diagram of the optical driving mechanism in FIG. 7.

FIGS. 7 to 8 are respectively an exploded view and a schematic view of an optical drive mechanism 2 according to another embodiment of the present invention. The optical driving mechanism 2 in this embodiment is substantially the same as the optical driving mechanism 1 described above, wherein the main difference is that the fixed portion U1' of the optical driving mechanism 2 includes the base 10', the holder 30 and the optical element L, and the movable portion U2' includes a carrier plate 20 and an optical element IM. The fixed portion U1' can be affixed to a housing member in the electronic device through the base 10', and the movable portion U2' can move relative to the fixed portion U1'. The holder 30 of the fixed portion U1' is integrally formed or affixed to the base 10'. The base 10" has a plurality of through holes T for the frame assembly F to be passed through to connect the holder 30 and the base 10 of the fixed portion U1' and the carrier plate 20 and the optical element IM of the movable portion U2'. Other component parts which are the same as or corresponding to those of the embodiment of FIGS. 1 to 2 (or slightly different in appearance), are not described herein again, and the same or corresponding elements are denoted by the same reference numerals.

In the present embodiment, the frame assembly F is connected to the carrier plate 20 of the movable portion U2' and the holder 30 of the fixed portion U1', wherein the connecting piece B4 of the frame assembly F is affixed to the holder 30, and the connecting piece B1' is affixed to the carrier plate 20. When a suitable driving signal is applied, the biasing elements W1 to W4 located within the frame assembly F contract or elongate to push or pull the carrier plate 20 and the optical element IM. Unlike the optical driving mechanism 1 in the foregoing FIG. 2, in the present embodiment, the frame assembly F and the biasing assembly W drive the carrier plate 20 and the optical element IM to move relative to the base 10', the holder 30 and the optical element L. By changing the posture or position of the carrier plate 20, the optical element IM, for example, a photosensitive element can be vertically displaced (linearly moved in the vertical) or tilted with respect to the optical element L to achieve optical focusing and optical shockproofing.

Figure 9:
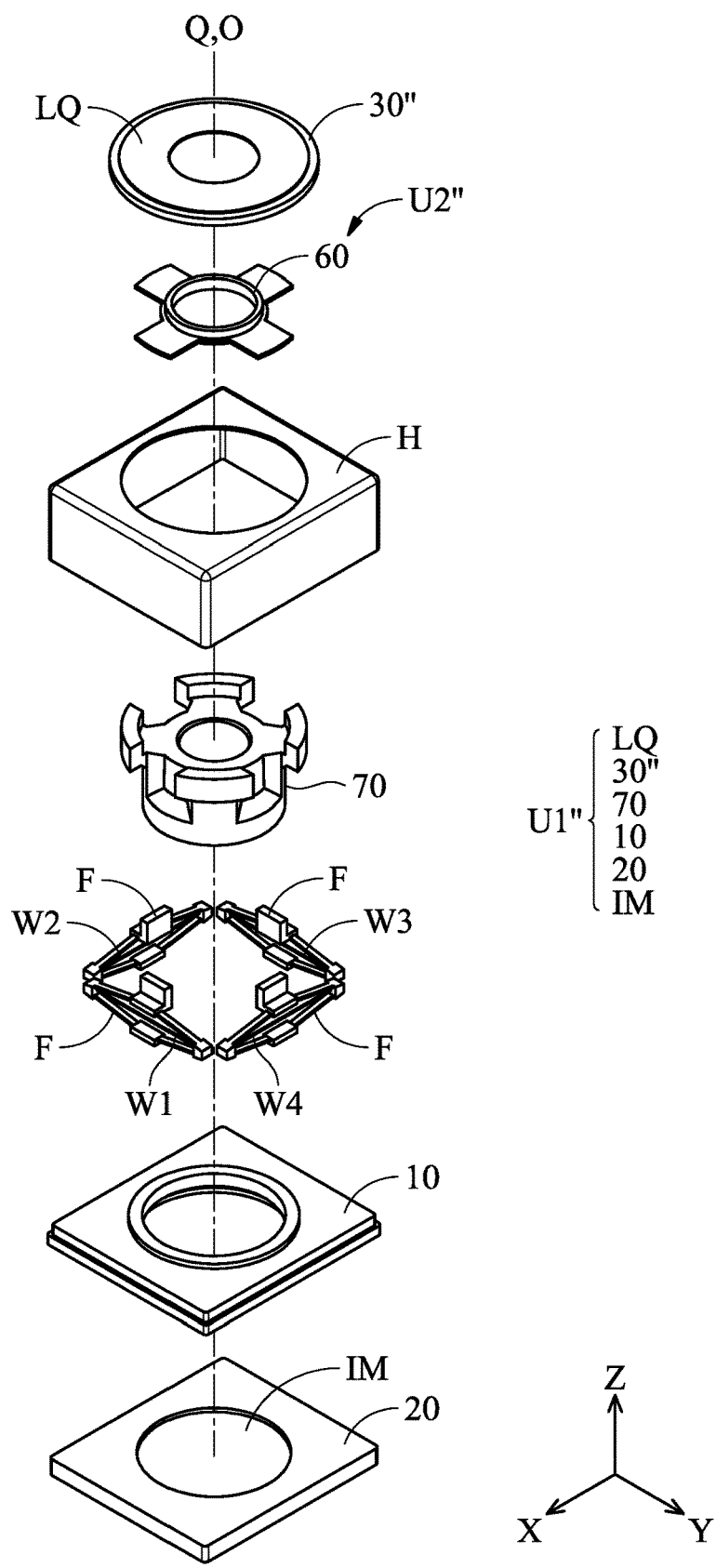
FIG. 9 is an exploded view diagram of an optical driving mechanism according to another embodiment of the present invention.
Figure 10:
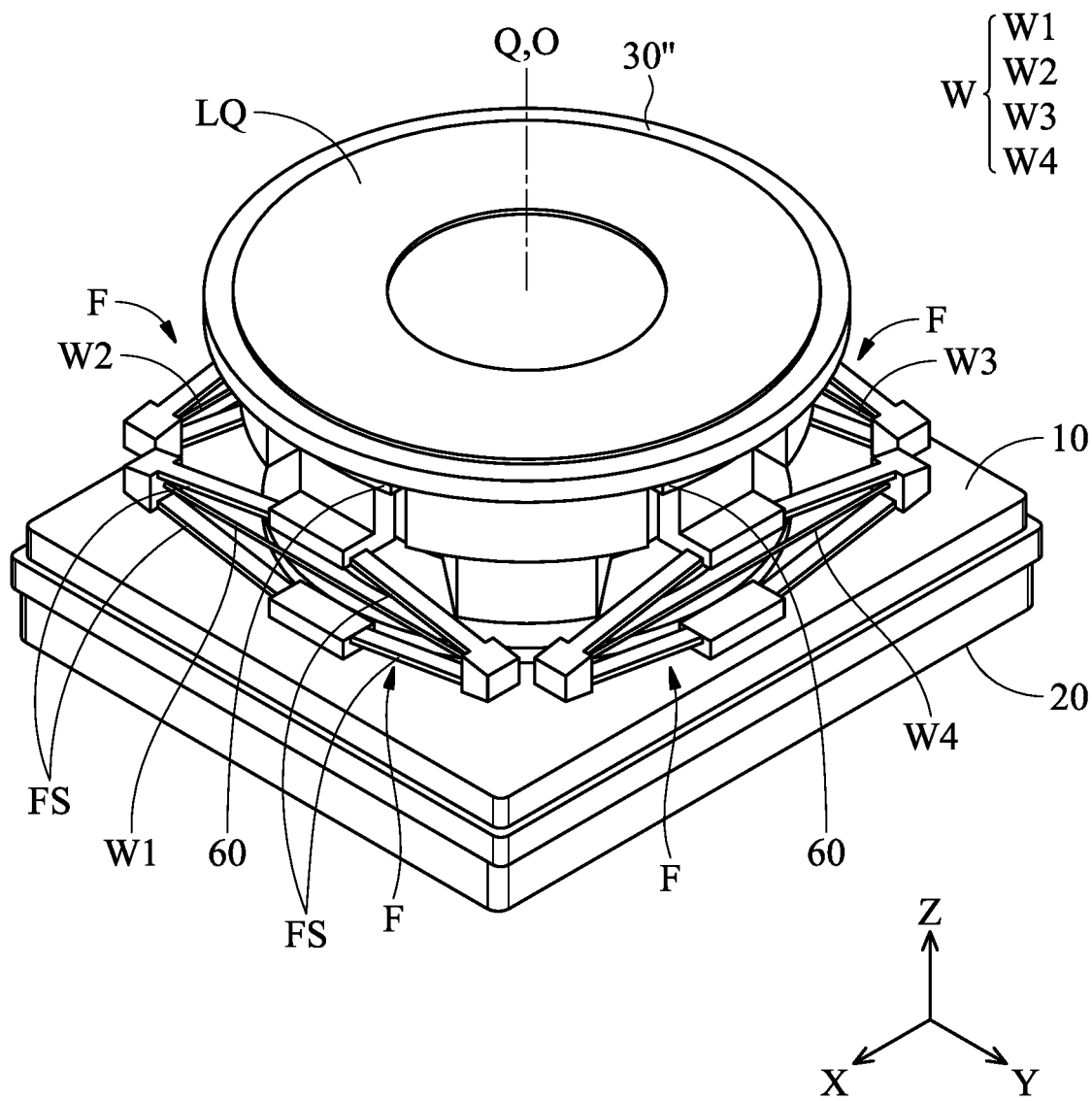
FIG. 10 is a schematic diagram of the optical driving mechanism in FIG. 9.

FIGS. 9 and 10 are respectively an exploded view and a schematic view of an optical driving mechanism 3 according to another embodiment of the present invention. The optical driving mechanism 3 in this embodiment is substantially the same as the optical driving mechanism 1 described above, and the main difference is that the fixing portion U1" of the optical driving mechanism 3 further includes a liquid optical element LQ, a holder 30" and a barrel 70, wherein the holder 30" is configured to sustain the liquid optical element LQ and the barrel 70 is configured to sustain the other optical element or assembly (such as an optical lens or an optical lens assembly). The movable portion U2" only contains a contact member 60 for in contact with the liquid optical element LQ. Other components that are identical to or corresponding to the embodiment in FIGS. 1 to 2 (or just slightly different in appearance) are not described herein again.

As shown in FIG. 10, the liquid optical element LQ and the holder 30" are disposed above and fixed to the barrel 70, and the contact member 60 is connected to the plurality of frame assemblies F and located above the barrel 70. In detail, when the biasing elements W1 to W4 in the frame assemblies F are applied with driving signals, the contact member 60 can be driven (or forced to move) which is same as or corresponding to the moving way of the holder 30 in FIGS. 4A-4C, so that the contact member 60 can be moved relative to the fixed portion U1".

Figure 11A:
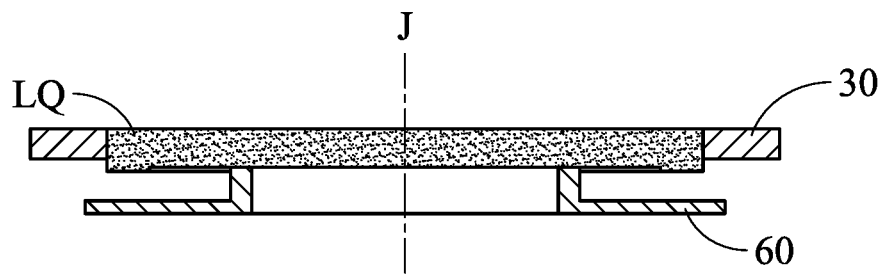
FIGS. 11A to 11C are schematic view diagrams showing the curvature changes of the liquid optical element of FIG. 10.
Figure 11B:
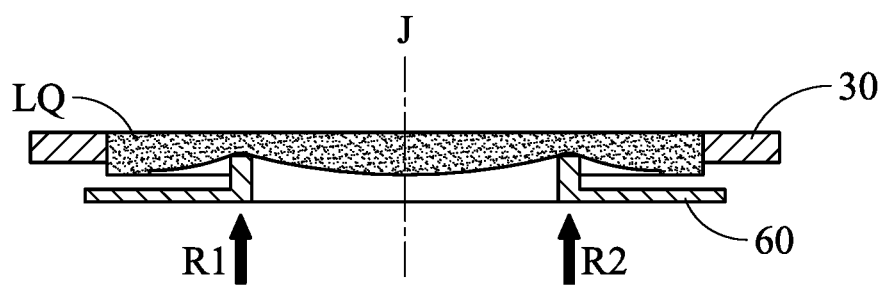
Figure 11C:
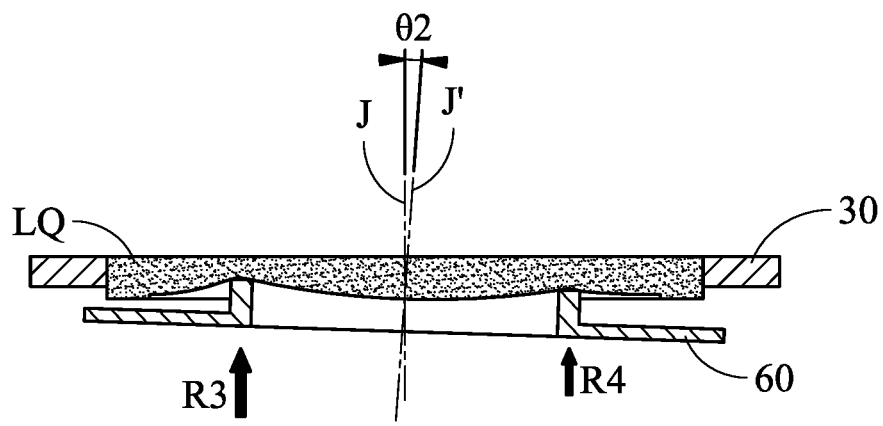

Please refer to FIGS. 11A to 11C for the manner in which the biasing elements W1 to W4 drive the contact member 60 to move relative to the liquid optical element LQ of the fixed portion U1". FIG. 11A shows that the biasing elements W1 to W4 are not deformed and the contact member 60 is held at an initial position, and the liquid optical element LQ has an initial lens central axis J. When suitable and identical driving signals are applied to the biasing elements W2 and W4 and they are contracted, the contraction of the biasing elements W2 and W4 to cause the two opposite frame assemblies F to deform, wherein the same displacement amounts R1 and R2 in the direction of the Z-axis is generated, so that the contact member 60 is pushed to move, as shown in FIG. 11B. In addition, the lens curvature of the liquid optical element LQ has been changed (compared to the lens curvature of the liquid optical element LQ at the initial position in FIG. 11A). Optical focusing can be achieved by changing the shape of the liquid optical element LQ.

Similarly, referring to FIG. 11C, when the driving signals applied to the biasing elements W2 and W4 are different in size (such as different signal strengths), the displacement amounts of the two frame assemblies F on the opposite sides are different: R3, R4, so that the contact member 60 is inclined (compared with the contact member 60 at the initially position in FIG. 11A). Therefore, the initial lens central axis J of the liquid optical element LQ is rotated to the lens central axis J', wherein there is an angular displacement θ2 therebetween, to achieve Optical Image Stabilization.

Figure 12:
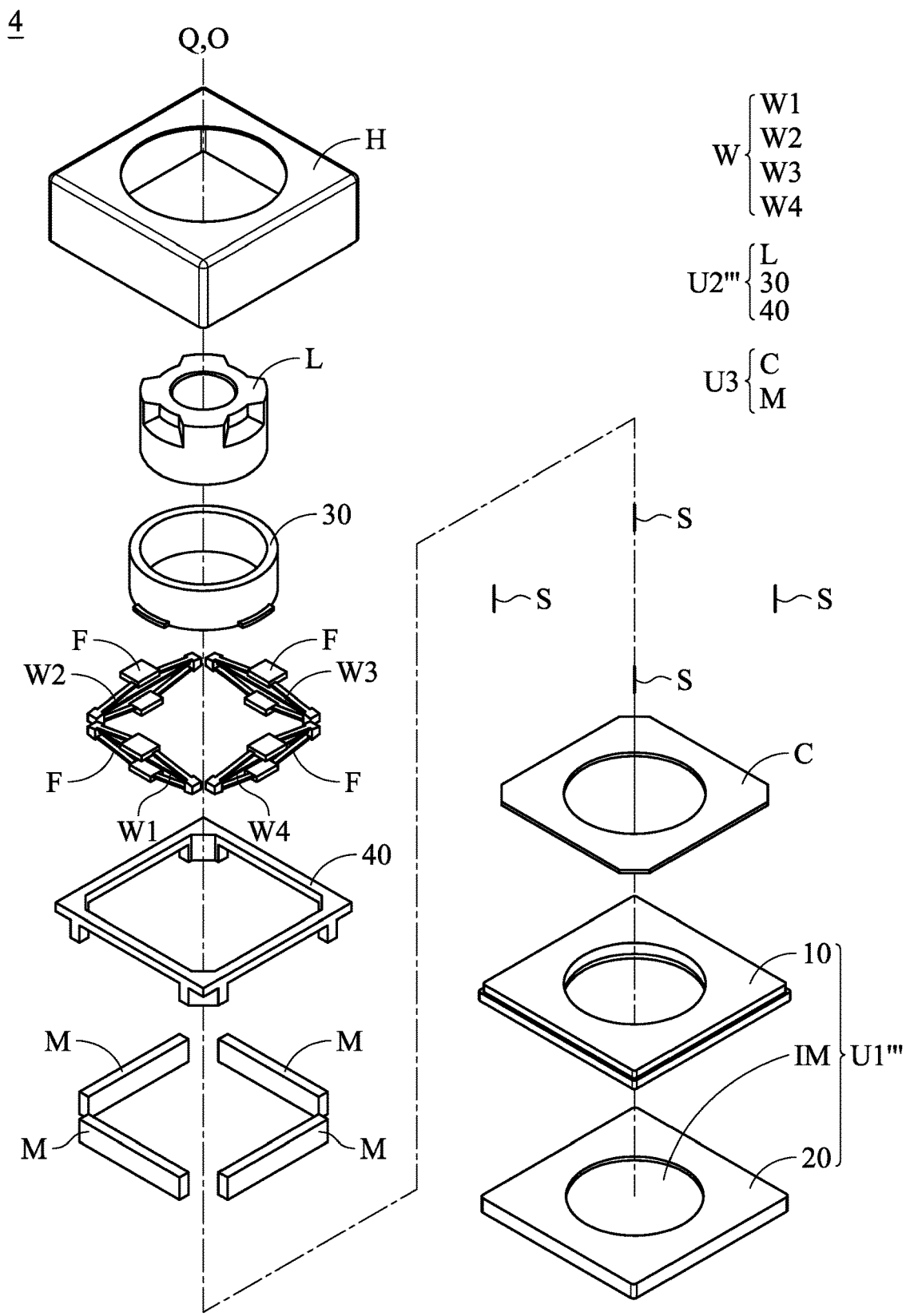
FIG. 12 is an exploded view diagram of an optical driving mechanism according to another embodiment of the present invention.
Figure 13:
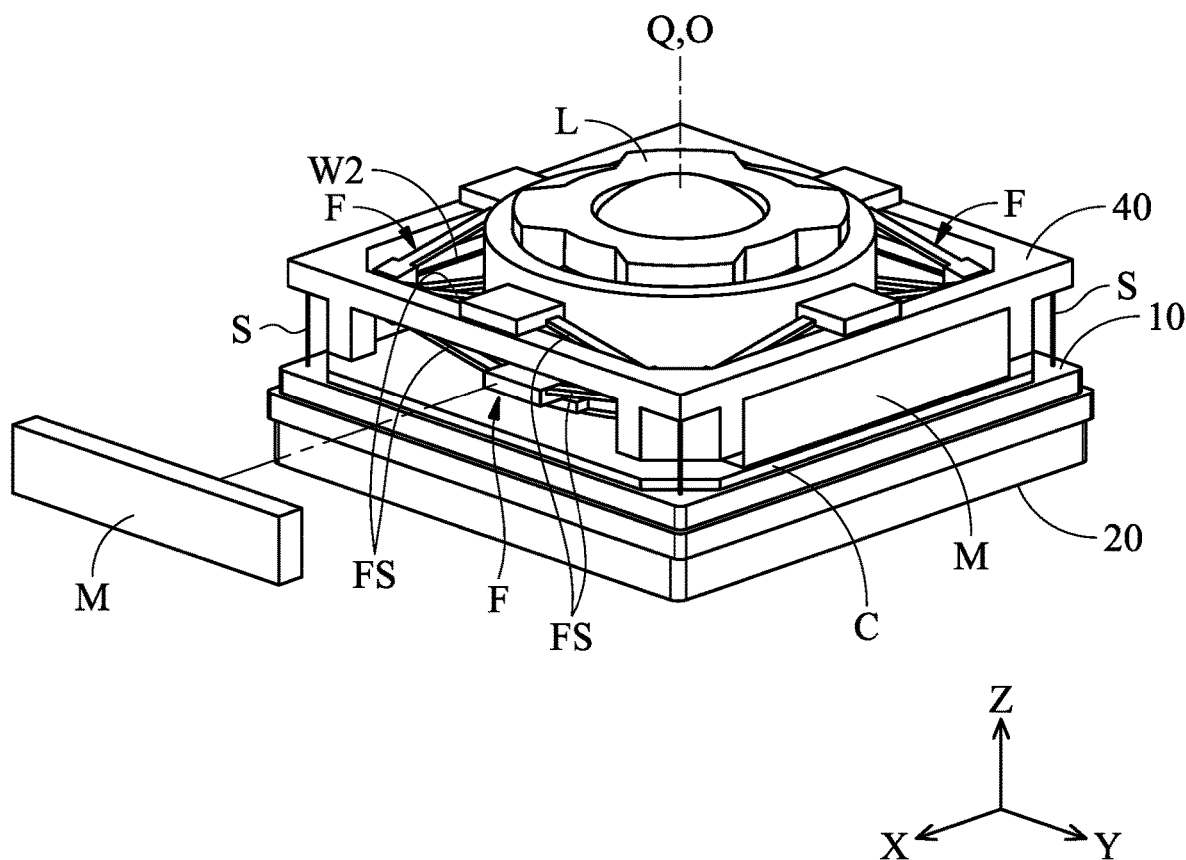
FIG. 13 is a schematic diagram of the optical driving mechanism in FIG. 12.

FIGS. 12 to 13 are exploded view and schematic view of an optical driving mechanism 4 according to another embodiment of the present invention. The optical driving mechanism 4 comprises a fixed portion U1''', a movable portion U2''', a plurality of frame assemblies F, a plurality of elastic members S, a biasing assembly W, a driving portion U3 and a housing H. The fixing portion U1''' can be affixed to a casing or an internal fixed structure in the electronic device, and the movable portion U2''' is movably connected to the fixed portion U1''' by the elastic members S. The movable portion U2''' includes an optical element L such as an optical lens, and the fixed portion U1''' includes an optical element IM such as a photosensitive element, and the movable portion U2''' is movable relative to the fixed portion U1'''. The optical element L can be moved relative to the optical element IM to achieve optical focusing or optical compensation. The structure of the optical driving mechanism 4 will be described in detail below.

The fixed portion U1''' includes a base 10, a carrier plate 20 and the optical element IM disposed on the carrier plate 20. The movable portion U2''' includes a holder 30, the aforementioned optical element L in the holder 30 and a support member 40 surrounding the holder 30. The elastic members S are, for example, elongated elastic suspension wires, elastically connecting the base 10 of the fixed portion U1''' with the support member 40 of the movable portion U2'''. The frame assembly F is connected to the support member 40 with the holder 30. The driving portion U3 is, for example, an electromagnetic driving assembly, including a coil C and a plurality of magnetic elements M (such as magnets) which are corresponding to each other. The coil C is, for example, a flat-plate driving coil which is disposed on the base 10 and affixed to thereon, and the magnetic elements M are disposed on the support member 40. When an appropriate driving signal (for example, driving current) is applied to the coil C, a magnetic force is generated between the coil C and the magnetic element M, and the driving portion U3 drives the supporting member 40 of the movable portion U2''', the frame assemblies F, the biasing assembly W, the holder 30 and the optical element L to move or tilt together relative to the base 10 of the fixed portion U1''', to achieve the effect of optical compensation. In addition, the driving portion U3 drives the moving direction of the movable portion U2''', for example, moving the movable portion U2''' in a first direction which is on the XY plane, or rotating the movable portion U2''' around X-axis or Y-axis. It should be noted that the aforementioned first direction is different from the direction of the central axis Q (Z-axis).

It should be noted that the movable portion U2''' in this embodiment also includes the frame assemblies F and the biasing assembly W which are the same as or similar to in the FIG. 2, and they are configured to drive the holder 30 and the optical element L to move relative to the base 10. In this way, the frame assemblies F and the biasing assembly W drive the holder 30 and the optical element L of the movable portion U2''', for example, to move along the central axis Q direction, or to make the optical axis O of the optical element L have angular displacement with respect to the central axis Q; and driving the entire movable portion U2''' by the driving portion U3, for example, moving the movable portion U2''' in the XY plane or rotating around X-axis or Y-axis. The combination of the two driving mechanisms enables the optical driving mechanism 4 to have better optical focusing and optical compensation, greatly improving the performance of the electronic device.

In summary, the present invention provides an optical driving mechanism, configured to drive an optical element, including a fixed portion, a movable portion, at least one frame assembly, and at least one biasing element. The fixed portion includes a base which has a central axis. The movable portion is configured to sustain the optical element and is movable relative to the fixed portion. The frame assembly connects the fixed portion and the movable portion and includes a plurality of string arms, wherein the string arms form at least one V-shaped structure. The biasing element is disposed on the frame assembly and configured to drive the movable portion to move along a central axis direction relative to the fixed portion, wherein the string arms surround the biasing element and the biasing element at least connects one end portion of the V-shaped structure. Therefore, the optical element in the movable portion is driven to move relative to the fixed portion by the biasing element, thereby achieving functions such as optical focusing or optical image stabilization. In addition, the biasing element is connected to the string arms which have the V-shaped structure, so that the driving stroke of the biasing element can be increased and the stability of driving the optical element also be enhanced, thereby improving the quality of the optical driving mechanism.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An optical driving mechanism, configured to drive an optical element, comprising:
   a fixed portion, including a base, wherein the base has a central axis;
   a movable portion, configured to sustain the optical element, and the movable portion is movable relative to the fixed portion;
   a frame assembly, connected to the fixed portion and the movable portion and including a plurality of string arms, wherein the string arms form two V-shaped structures, and the V-shaped structures form a parallelogram structure; and
   a biasing element, including two ends, wherein the biasing element is disposed on the frame assembly and configured to force the movable portion to move relative to the fixed portion along the direction of the central axis, wherein the string arms enclose the biasing element, and the two ends of the biasing element are respectively connected to end portions of the V-shaped structure, and the end portions of the V-shaped structures are electrically connected to each other via the biasing element.

2. The optical driving mechanism as claimed in claim 1, wherein the frame assembly at least includes four string arms.

3. The optical driving mechanism as claimed in claim 1, wherein an extending direction of the biasing element is not parallel to the direction of the central axis.

4. The optical driving mechanism as claimed in claim 1, wherein the string arms and the biasing element are disposed on a first surface, and the first surface is parallel to the central axis.

5. The optical driving mechanism as claimed in claim 1, wherein an angle between the string arms and the biasing element is less than 45 degrees.

6. The optical driving mechanism as claimed in claim 1, wherein the biasing element connects the two end portions of the two sides of the V-shaped structure, and an extending direction of the biasing element is parallel to the central axis.

7. The optical driving mechanism as claimed in claim 1, wherein the frame assembly further includes an electrical conductor disposed on at least one of the string arms of the frame assembly in a manner of insert molding or 3D molded interconnect device technology, and the electrical conductor is electrically connected to the biasing element.

8. The optical driving mechanism as claimed in claim 1, further comprising a detection element, configured to detect the motion of the movable portion relative to the fixed portion, wherein the detection element, the frame assembly and the biasing element are arranged along the central axis.

9. The optical driving mechanism as claimed in claim 1, further comprising three frame assemblies which are stacked in the direction of the central axis, and the frame assemblies and the biasing element consist of a frame module, wherein in the direction of the central axis, the one of the frame assemblies that is in the middle position surrounds the biasing element.

10. The optical driving mechanism as claimed in claim 1, further comprising a plurality of frame assemblies and a plurality of biasing elements, wherein the frame assemblies enclose the movable portion, and the biasing elements are electronically independent of each other.

11. The optical driving mechanism as claimed in claim 1, further comprising a plurality of frame assemblies which are stacked in the direction of the central axis.

12. The optical driving mechanism as claimed in claim 11, further comprising a plurality of biasing elements, wherein the string arms of each frame assembly enclose one biasing element.

13. The optical driving mechanism as claimed in claim 1, wherein the optical element is an image sensor.

14. The optical driving mechanism as claimed in claim 13, wherein the base has at least one through hole, and the frame assembly extends through the through hole and is connected to the base and the image sensor.

* * * * *